March 17, 1964   R. A. CLAY   3,124,863
DRILL PIPE PEENING

Filed Sept. 10, 1959   7 Sheets-Sheet 2

INVENTOR.
ROBERT A. CLAY
BY
ATTORNEY

March 17, 1964 R. A. CLAY 3,124,863
DRILL PIPE PEENING
Filed Sept. 10, 1959 7 Sheets-Sheet 4

INVENTOR.
ROBERT A. CLAY
BY
ATTORNEY

INVENTOR.
ROBERT A. CLAY
BY
ATTORNEY

United States Patent Office 3,124,863
Patented Mar. 17, 1964

3,124,863
DRILL PIPE PEENING
Robert A. Clay, Odessa, Tex., assignor to American Shot-peening Corporation, Fort Worth, Tex., a corporation of Texas
Filed Sept. 10, 1959, Ser. No. 839,191
11 Claims. (Cl. 29—90)

This invention relates generally to improvements in the art of increasing the fatigue life of drill pipe and the like, and more particularly, to an improved method and apparatus for shot peening the inner and outer surfaces of drill pipe, as well as coating the inner and outer surfaces of the peened drill pipe with a corrosion protective material.

The advantages of shot peening machine and mechanical elements have long been recognized in some industries. For example, it is a common expedient in the automobile industry to shot peen various portions of an automobile structure, such as leaf springs and crank shafts. It is the generally accepted theory that the impingement of a plurality of shot on the surface of an element provides residual compressional forces in the surface layers of the structure and minimizes subsequent failure of the element by the effect of fatigue. A fatigue failure is generally recognized as being due to the repeated application of tensile stresses in the outer surface layers of an element.

Several industrial concerns are in the business of designing and selling various types of shot peening equipment, such as shot throwing wheels which discharge the shot by centrifugal force, spray heads which discharge the shot at a high velocity by the action of air pressure, and various designs of shot cleaning, separating and automatic adding equipment to provide a continuous shot peening operation. Heretofore, however, shot peening has been limited to rather small elements which can be completely housed within a shot peening chamber and which may be rather easily manipulated to provide a peening of the desired surface areas of the elements. On the other hand, each joint of drill pipe used in the rotary drilling of oil and gas wells is usually about 30 feet long which makes it impractical to completely house a joint in a peening chamber, and each joint of drill pipe weighs several hundred pounds which makes it extremely difficult to handle the drill pipe in such a manner that all of the surface areas of the drill pipe may be effectively peened.

The present invention contemplates a novel system for increasing the fatigue life of a joint of drill pipe which may be broadly defined as the combination of a shot receiving chamber having an opening in one side thereof, means for inserting and withdrawing one end portion of the joint in and out of said opening, means for rotating the joint about its longitudinal axis while said one end portion extends into said opening, means for shot peening the inner surface of the rotating joint and discharging the used shot through the joint into said chamber, an outside peening chamber, conveyor means for moving the joint lengthwise through the outside peening chamber while simultaneously rotating the joint about its longitudinal axis, and means in the outside peening chamber for throwing shot onto the outer surface of the joint as it is moved through the outside peening chamber. This invention further contemplates a system of increasing the fatigue life of a joint of drill pipe wherein the drill pipe is coated, both on its inner and outer surfaces, with a suitable preservative material to minimize corrosion of the joint while it is being stored and before it is reused in a rotary drilling operation.

I have found that the peening of the inside and outside surfaces of drill pipe eliminates many small surface discontinuities peculiar to drill pipe, such as surface pitting, handling marks, mill scale, etc., and that the fatigue life of the pipe is substantially increased. As it is well known in the oil well drilling industry, drill pipe that has been used is usually characterized by having a variable amount of corrosion on its inner surface. I have found that when such a used joint of drill pipe is shot peened, the corroded layer is removed, all small surface defects are closed up, and larger surface defects are exposed for easy detection by one of the commercially available inspecting devices, such that the possibility of improper use and failure of the drill pipe is minimized. Furthermore, shot peening provides increased surface areas on the inside and outside of the drill pipe to provide more wearing surfaces without an increase in the conventional size or weight of the drill pipe, and the inside and outside surfaces of the drill pipe are roughened to facilitate the adherence of plastic materials, such as the drilling mud used during a drilling operation, to provide lubrication for the pipe.

An important object of this invention is to provide a complete system for efficiently and economically peening the inside and outside surfaces of drill pipe and applying a preservative coating on all the surfaces of the drill pipe.

Another object of this invention is to provide a novel construction for moving drill pipe into position for internal peening and rotating the pipe during the internal peening operation, with a minimum of equipment and manual effort.

Another object of this invention is to provide a novel structure for simultaneously moving a plurality of shot spray heads through a series of joints of drill pipe for internal peening of the pipe.

Another object of this invention is to provide a novel spray head for discharging shot against the inner surface of a rotating joint of drill pipe.

A further object of this invention is to provide a novel structure for simultaneously conveying and turning drill pipe around its longitudinal axis through an outside peening chamber in such a manner that only a portion of a joint of drill pipe is disposed within the outside peening chamber at any one time, whereby the outside peening chamber may be of practical size.

Another object of this invention is to provide a novel arrangement of shot throwing wheels which provides the most efficient peening of the outside surfaces of the drill pipe.

Another object of this invention is to provide a novel construction for moving a joint of drill pipe from the conveyer construction to a dipping vat.

A further object of this invention is to provide an automatic carrier for moving a joint of drill pipe through a dipping vat in such a manner that the pipe will be efficiently coated on all of its surfaces.

A still further object of this invention is to arrange the various portions of the system in a compact arrangement and provide for the peening of both the inside and outside surfaces of drill pipe with a minimum of manual labor and with the minimum possibility of over peening or under peening by human errors.

Other objects and advantages of the invention will be evident from the following detailed description, when read in conjunction with the accompanying drawings which illustrate my invention.

In the drawings:

FIGURE 5 is a plan view of the structure shown in FIG. 4.

Figure 1:
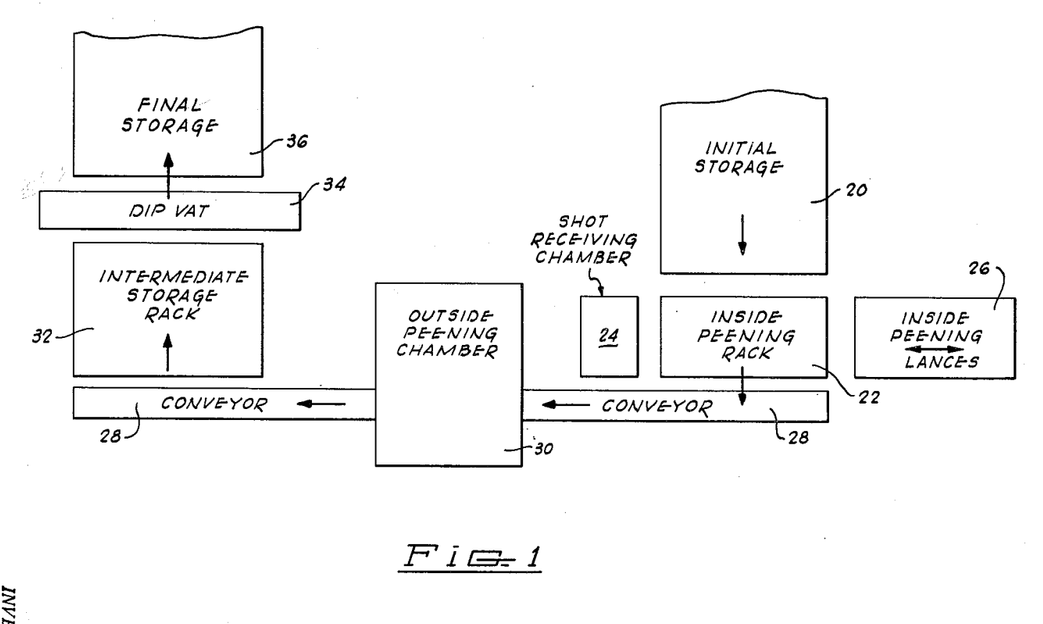
FIGURE 1 is a schematic drawing in the nature of a flow diagram of the present system.

Before proceeding to a description of the detailed construction of the various portions of the present system, reference should first be made to the schematic flow diagram in FIG. 1. In this drawing, reference character 20 designates a storage area in which a plurality of joints of drill pipe are stored prior to being peened by the present system. The storage area 20 is normally provided with one or more pipe racks on which the drill pipe may be stored and easily moved by being manually rolled in the direction indicated by the arrow in FIG. 1. The joints of drill pipe are first moved onto an inside peening rack 22, which will be described in detail below, and which simultaneously raises a plurality of the joints of drill pipe into peening position and inserts one set of the end portions of the drill pipe into a shot receiving chamber 24 for receiving shot used in the internal peening operation. While the drill pipe is supported on the rack 22, it is simultaneously rotated and the shot spray heads (not shown in FIG. 1) are moved through the rotating drill pipe by a lance structure 26, as will also be described in detail below.

After the inside peening operation, the rack 22 is lowered and the joints of drill pipe are moved onto a conveyer means 28 as indicated by the arrow in FIG. 1. The conveyer means 28 simultaneously moves the joints of drill pipe lengthwise through the outside peening chamber 30 and turns the drill pipe about its longitudinal axis for an efficient outside peening operation. Following the outside peening in the chamber 30, the joints of drill pipe are sequentially moved over an intermediate storage rack 32 and through a dipping vat 34 where the internally and externally peened joints are coated with a suitable preservative material. The coated joints of drill pipe are then moved into a final storage area 36 which also usually comprises suitable pipe racks along which the joints of drill pipe may be manually rolled away from the dipping vat 34.

Figure 2:
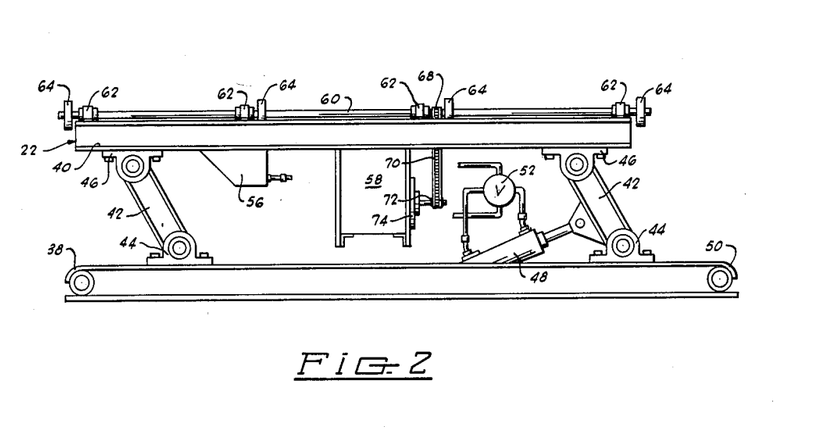
FIGURE 2 is a side elevational view of the inside peening rack for raising several joints of drill pipe into position for internal peening and for rotating the drill pipe during the internal peening operation.
Figure 3:
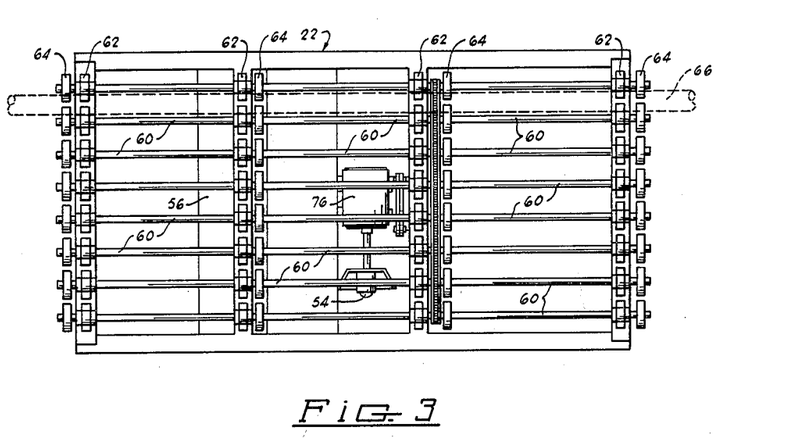
FIGURE 3 is a plan view of the rack shown in FIG. 2.

The inside peening rack 22 is illustrated in detail in FIGS. 2 and 3 and generally comprises an elongated base 38 of any suitable construction and an elongated platform 40 supported above the base 38 by a plurality of legs 42. Each leg 42 is secured at its lower end by means of a bearing 44 to the upper surface of the base 38 and the upper end of each leg 42 is secured by another bearing 46 to the under face of the platform 40, such that the legs are pivotally secured to both the base 38 and the platform 40. Any desired number of the legs 42 may be used, although I prefer to provide a leg at each corner of the platform 40 which I have found to be adequate support when the platform 40 receives four joints of drill pipe, as will be described. One of the legs 42 is pivotally connected to a suitable double acting hydraulic ram 48 which is also pivotally secured (not shown) to the base 38. When the ram 48 is extended, all of the legs 42 will be pivoted clockwise with respect to the base 38 when viewed as in FIG. 2 to provide an upward and lengthwise movement of the platform 40 toward the end 50 of the base 38. It should also be noted that all of the legs 42 are preferably of the same length, such that the platform 40, legs 42 and base 38 form a parallelogram to retain the platform 40 parallel with the base 38 during pivoting movement of the legs 42. Therefore, the platform 40 is maintained horizontal during the upward and lengthwise movement thereof upon actuation of the ram 48. It will be apparent that when the ram 48 is retracted, the movement of the platform 40 will be in an opposite direction to move the platform away from the end 50 of the base 38 and simultaneously lower the platform to the position indicated in FIG. 2.

The ram 48 is controlled by a suitable control valve 52, such as a four-way valve, having one side thereof connected (not shown) to a suitable pump 54 and the other side thereof connected (not shown) directly to a hydraulic fluid reservoir 56. The control valve 52 is preferably supported in an accessible position for the operator of the rack 22, and the pump 54 may be easily supported on a brace structure 58 extending downwardly from the central portion of the platform 40. The reservoir 56 for the hydraulic fluid may also be easily supported on the under face of the platform 40.

An even number of shafts 60 are supported lengthwise on the top of the platform 40 in parallel relation by suitable bearings 62, and each shaft 60 is provided with a plurality of rollers 64 secured in spaced relation along the length thereof. As illustrated in FIG. 3, a joint of drill pipe 66 may be supported on the rollers 64 above and between each pair of the shafts 60. In a preferred system, eight of the shafts 60 are provided on the platform 40 to simultaneously support four of the joints of drill pipe 66. It will also be noted that each joint of drill pipe 66 protrudes beyond the opposite ends of the platform 40 and the shafts 60 when the drill pipe is supported centrally on the rack. Therefore, the opposite ends of the drill pipe 66 will be accessible for the internal peening operation, as will be described. Each shaft 60 is also provided with a suitable sprocket 68 around which extends a continuous chain 70 for simultaneously rotating the shafts 60 and therefore rotating the joints of drill pipe 66 by frictional engagement between the rollers 64 and the respective joints of drill pipe. It will be observed that the chain 70 extends over all of the sprockets 68 and then downwardly beneath the platform 40 into engagement with a sprocket 72 connected to the output shaft of a gear box 74 driven by a suitable motor 76. The motor 76 may be used to drive both the gear box 74 and the pump 54 used for raising and lowering the platform 40. Thus the joints of drill pipe 66 may be rotated when the platform 40 is in any desired position, such that the drill pipe supported on the inside peening rack 22 may be raised, lowered, moved lengthwise and rotated by manipulation of the various portions of the rack 22 for the efficient internal peening of the drill pipe, as will be described.

As previously indicated, the inside peening rack 22 is utilized in conjunction with the inside peening lance structure 26 which is illustrated in detail in FIGS. 4, 5, 6 and 7. In the preferred embodiment, four lances 80 extend forwardly from a carriage 82 at the level of the joints of drill pipe 66 supported on the inside peening rack 22 when the rack 22 is raised as previously described. Each lance 80 is in the form of an elongated tubular member having a length greater than the length of the respective drill pipe 66 being peened and having a diameter substantially less than the respective joint of drill pipe. It is preferred each lance 80 be of rather strong construction to be self supporting along its length with a minimum of bending for an efficient peening operation, as will be described. I have found that each lance 80 may be constructed out of a 1½-inch heavy wall pipe and will then be of a size to move through standard sizes of drill pipe. The outer end 84 of each lance 80 is connected to a coupling 86 suitably bolted onto the carriage 82. Each coupling 86 is in turn connected to a hose 88 leading from a suitable shot mixing head 90. The mixing head 90 may be of any desired construction which will provide a distribution of shot and air fed to the head through tubes 92 and 94 (such a mixing head is made by the Pangborn Company of Hagerstown, Maryland), whereby the shot will be blasted through the tubes 88 and into the lances 80 at the desired velocity.

Figure 4:
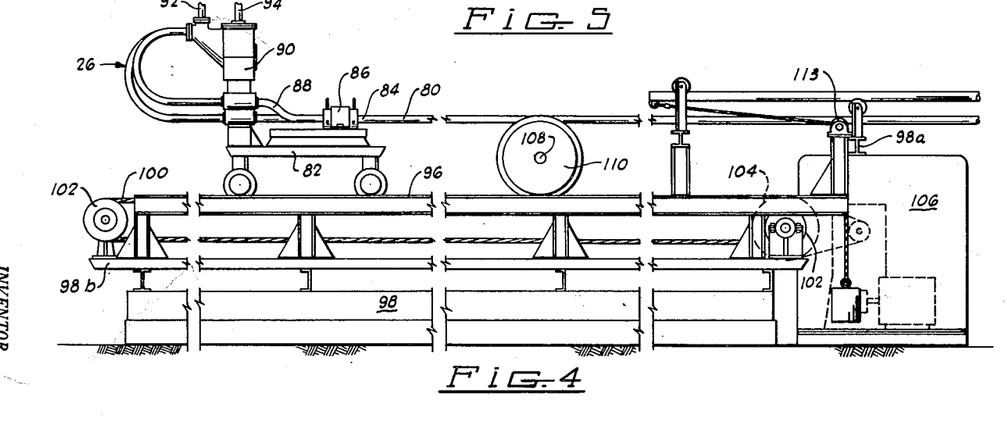
FIGURE 4 is a side elevational view of the major portion of the structure utilized for moving spray heads through rotating joints of drill pipe for the internal peening operation.

The carriage 82 is supported on a set of tracks 96 supported by a suitable frame structure 98 in alignment with the base 38 of the inside peening rack 22. Thus, the carriage 82 may be moved toward and away from the inside peening rack 22 to insert and withdraw the lances 80 from the joints of drill pipe 66, as will be described. The carriage 82 is moved by means of a pair of cables 100 extending around pulleys 102 at each end of the frame structure 98. Each pair of the pulleys 102 at each end of the frame structure 98 is supported on a suitable shaft and one set of the pulleys 102 are turned by means of a drive pulley 104 suitably connected to a power unit 106. Each of the cables 100 is suitably anchored (not shown) to the carriage 82, such that the carriage 82 will be moved along the tracks 96 when the cables 100 are moved by the pulleys 102. It will be understood that the power unit 106 will be under the control of the operator for reversing the movement of the carriage 82 when and as desired.

A shaft 108 extends transversely across the framework 98 underneath the lances 80 and has wheels 110 on the opposite ends thereof engaging the tracks 96. The shaft 108 is also provided with a suitable roller 112 secured thereon underneath each of the lances 80 to provide an intermediate support between the opposite ends of the lances. When the carriage 82 is moved along the tracks 96, the intermediate portions of the lances 80 rest on the rollers 112, and the shaft 108 is turned to move the wheels 110 along the tracks 96 to maintain the rollers 112 in spaced relation with respect to the carriage 82 and provide additional support for the lances which minimizes the bending of the lances and facilitates the insertion and withdrawal of the lances in the drill pipe 66 supported on the inside peening rack 22. Normally, some slippage will occur between the lances 80 and the respective rollers 112 during lengthwise movement of the lances, such that the wheels 110 will not move the same distance as the wheels of the carriage 82 to retain the rollers 112 in supporting position underneath intermediate portions of the lances. Also, a supporting roller 113 is provided on the end 98a of the frame 98 for each of the lances to guide and support the lances.

Figures 6, 7, 8:
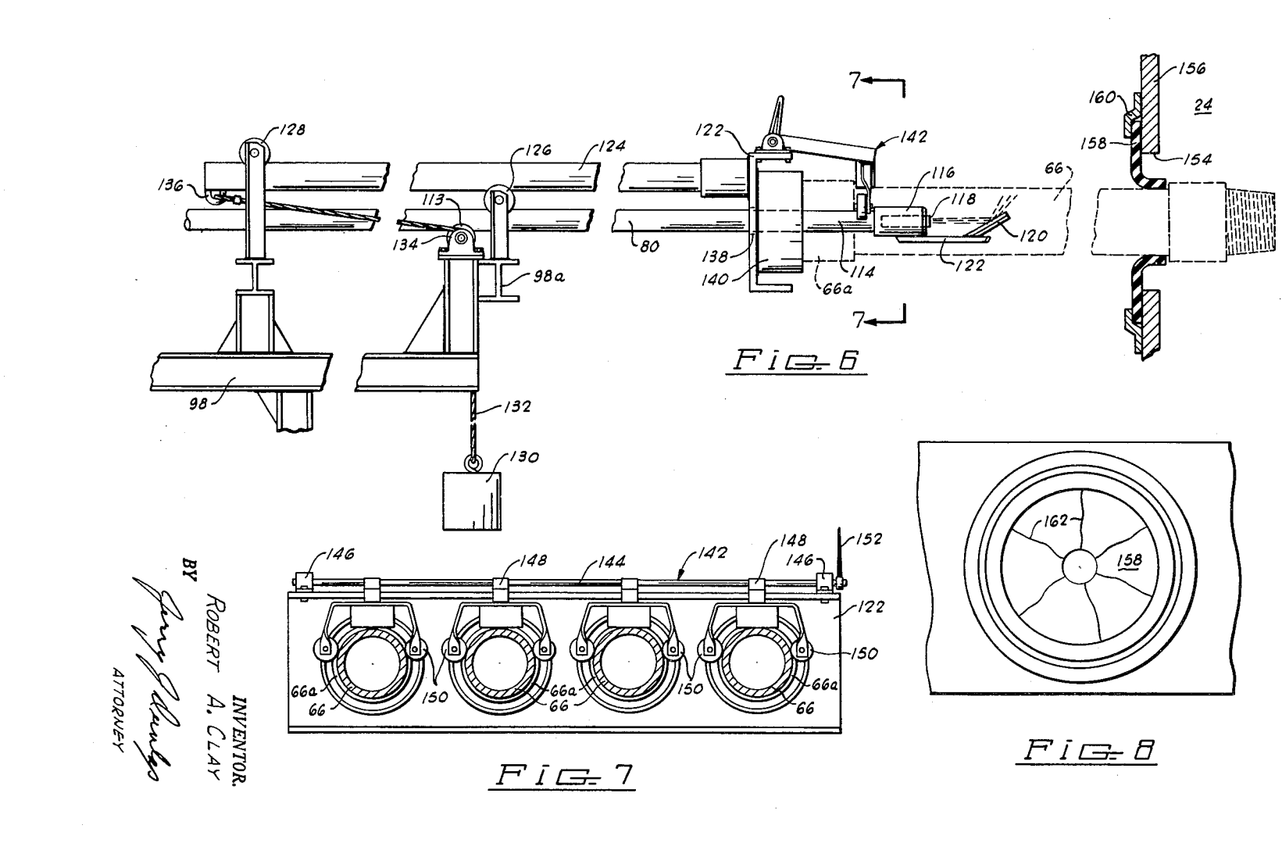
FIGURE 6 is an enlarged side elevational view of a spray head and other portions of the preferred internal peening structure illustrating an inside peening operation.
FIGURE 7 is a sectional view as taken along lines 7—7 of FIG. 6.
FIGURE 8 is an elevational view of a typical opening into the shot receiving chamber which receives shot used in the internal peening operation.

As shown in FIG. 6, the inner end 114 of each of the lances 80 is provided with a spray head 116 slightly larger in outside diameter than the lances but of a size to be moved freely through the respective joint of drill pipe 66. Each spray head 116 comprises a reduced diameter nozzle 118 for discharging the shot from the respective lance in a confined stream toward a deflecting member 120. The deflecting member 120 is preferably in the form of a square cross-sectional bar of highly wear resistant metal (such as a lathe cutting tool) and is secured at an angle of approximately 30 degrees from the horizontal, with the upper end of the member 120 being spaced approximately 2½ inches from the adjacent end of the nozzle 118. I have found that with this construction, the shot is deflected substantially radially by the member 120 in the nature of a halo against the inner surfaces of the drill pipe 66. The member 120 is suitably supported in alignment with the nozzle 118 by an arm 122 which may be welded to the head 116 and the lower end of the member 120.

As also shown most clearly in FIG. 6, a head member 122 is supported adjacent to the end 98a of the frame 98 by means of a pair of supporting pipes 124 arranged at each side of the frame 98. Each pipe 124 extends over a suitable roller 126 and under a suitable roller 128 supported by the frame 98, such that the pipe 124 will be maintained horizontally and parallel with the lances 80. It may also be noted that the head 122 is constantly urged toward the drill pipe 66 supported on the inside peening rack 22 by means of a weight 130 connected to a cable 132 which extends upwardly over a suitable roller 134 into connection with the outer end 136 of the respective pipe 124. A weight 130 may be used on each side of the frame 98 if desired to provide a more uniform force on the head 122.

The head 122 is provided with an aperture 138 therethrough for each of the lances 80 of a size to slidingly receive the respective lance, but having a diameter less than the outer diameter of the respective spray head 116. Therefore, when the lances 80 are moved away from the drill pipe 66 supported on the inside peening rack 22, the spray heads 116 will contact the head 122 and move the head 122 toward the frame 98 away from the pipe 66 against the action of the weight 130. Also, the head 122 is provided with a circular flange member 140 concentrically around each of the apertures 138 to receive the respective end of the drill pipe 66 when the head 122 is moved toward the inside peening rack 22. It will be apparent that when the lances 80 are moved toward the drill pipe 66 supported on the inside peening rack 22, the head 122 will be moved by action of the weight 130 to telescope the circular flanges 140 over the respective ends of the drill pipe 66. When the circular flanges 140 are thus telescoped over the respective ends of the joints of drill pipe 66, the joints are held against independent longitudinal movement by a holding mechanism 142 which is shown in FIGS. 6 and 7.

The holding mechanism 142 comprises a shaft 144 supported on top of the head 122 by suitable bearings 146 and is of a length to extend over the entire length of the head 122 above each of the circular flanges 140. A bifurcated arm 148 is rigidly secured on the shaft 144 above each of the circular flanges 140 and is provided with a pair of rollers 150 in the outer ends thereof for engaging the outer periphery of the drill pipe 66. It will be observed in FIG. 7 that the rollers 150 of each arm 148 are spaced apart a distance to engage the outer periphery of the respective drill pipe 66 immediately inward of the enlarged portion 66a of the respective joint. As it is well known in the art, each joint of drill pipe has an internally threaded box 66a on one end thereof and an internally threaded pin 66b on the opposite end thereof. In the present system the joints of drill pipe 66 are supported on the inside peening rack 22 in such a position that that the boxes 66a of the joints extend toward the head 122, such that these boxes will be inserted in the circular flanges 140 when the head 122 moves into the position shown in FIG. 6. As it is also well known, the box portion 66a of a joint of drill pipe 66 is larger in outer diameter than the remaining body portion of the joint, such that the rollers 150 will engage the inner end of the respective box 66a and prevent movement of the respective joint 66 away from the head 122 during a internal peening operation. The shaft 144 is provided with a suitable operating handle 152 on one end thereof to simultaneously pivot the arms 148 and move the rollers 150 into or out of engagement with the drill pipe 66.

As previously described in connection with FIG. 1, the inside peening rack 22 is positioned between the lance structure 26 and the shot receiving chamber 24 and that the joints of drill pipe supported by the inside peening rack 22 are inserted into the shot receiving chamber 24 upon operation of the rack 22 for discharging the used shot into the shot receiving chamber. For this purpose, (see FIG. 6), I provide an opening 154 in the respective wall 156 of the shot receiving chamber 24 for each joint of drill pipe 66. The opening 154 for each joint of drill pipe is substantially larger than the respective drill pipe and is normally closed by an elastic plate or cover 158 (such as rubber) secured around the edges of the opening 154 by a ring 160. The cover 158 is provided with a plurality of slits 162 therein as illustrated in FIG. 8, such that the pin end 66b of the respective joint of drill pipe 66 may be easily inserted and withdrawn through the opening 154. However, when the drill pipe 66 is withdrawn from the opening 154, the slits 162 in the elastic cover 158 will tend to close and prevent the loss of shot from the shot receiving chamber 24. It will also be observed that the elastic cover 158 will grip the outer periphery of the drill pipe 66 when the pipe is inserted through the opening 154 to effectively close the opening around the drill pipe and further prevent loss of shot during the inside peening operation.

To perform the inside peening operation in accordance with the present invention, the carriage 82 is first moved along the tracks 96 to the end 98b of the supporting frame structure 98 to move the lances 80 away from the inside peening rack 22. It will be observed that upon this retraction movement of the lances 80, the spray heads 116 will engage the head 122 and simultaneously move the head 122 toward the frame 98 against the action of the weight 130. It will be understood that at this time no shot is being fed to the mixing head 90 through the hoses 92 and 94. Also, the platform 40 of the inside peening rack 22 is moved downwardly to the position shown in FIG. 2 at the beginning of a peening operation.

Four joints of drill pipe 66 are rolled from the initial storage 20 onto the inside peening rack 22 and are positioned centrally on the rack 22, with each joint being supported by two sets of the rollers 64 on the shafts 60, such that the joints of drill pipe are supported in side-by-side spaced relation on the rack 22 with the opposite ends of the drill pipe extending beyond the opposite ends of the rack 22. It may also be noted that the lowered position of the rack 22 may be easily designed to be below the level of the racks in the initial storage area 20, such that the joints of drill pipe may be more easily positioned on the rack 22. With the drill pipe in position on the rack 22, the ram 48 is actuated to pivot the legs 42 to raise the platform 40 and simultaneously move the platform 40 toward the end 50 of the base 38, which is also toward the shot receiving chamber 24. This movement of the rack 22 raises the drill pipe to the level of the lances 80 and moves one set of ends of the drill pipe through the respective openings 154 into the shot receiving chamber 24. It may also be noted that the joints of drill pipe 66 are then supported horizontally. Furthermore, the chamber 24 is preferably spaced from the inside peening rack 22 such a distance that the pin ends 66b of the drill pipe 66 will be inserted through the openings 154 when the legs 42 are extended substantially vertical, such that the joints of drill pipe 66 will not move any substantial distance up and down as they are inserted through the opening 154. As a result, the openings 154 can be made of minimum diameter and still receive the respective ends of the drill pipe 66 without tearing or damage of the elastic covers 158.

The carriage 82 is then moved toward the end 98a of the frame 98 to insert the spray heads 116 in the boxes 66a of the drill pipe 66. It will also be noted that the head 122 will also move toward the drill pipe supported on the rack 22 when the lances 80 are moved toward the drill pipe, such that the circular flanges 140 will be telescoped over the boxes 66a of the drill pipe. When the boxes 66a of the drill pipe are contacted by the head 122, the operating lever 152 is turned to lower the arms 148 and move the rollers 150 into engagement with the drill pipe 66 immediately inward of the boxes 66a. The shafts 60 on the inside peening rack 22 are then rotated to start the rotation of the drill pipe 66. It may again be noted that during this rotation of the drill pipe, the rollers 150 retain each joint of drill pipe in a fixed longitudinal position with respect to the head 122 to prevent independent lengthwise movement of the joints further into or out of the shot receiving chamber 24 and to retain the drill pipe in a fixed longitudinal position with respect to the frame 98.

With the drill pipe 66 rotating, high pressure air and shot are fed through the hoses 92 and 94 to the mixing head 90, whereby shot is fed through each of the lances 80 and discharged by the respective nozzle 118 against the deflecting member 120. While the shot is being discharged from each of the spray heads 116, the carriage 82 is moved further toward the end 98a of the frame 98 to move the spray heads 116 lengthwise through the rotating drill pipe 66. As a result, the shot being discharged in the form of a halo from the spray head 116 inside of each joint of drill pipe will effectively peen the inner surfaces of the joint. When each spray head has moved throughout the length of the respective drill pipe 66, the movement of the carriage 82 is reversed to move the spray heads 116 back through the entire length of the drill pipe 66. During this entire discharge of shot against the inner surfaces of the drill pipe 66, it will be understood that the high pressure air used for forcing the shot at a high velocity against the drill pipe is also utilized to blow the used shot through the drill pipe into the shot receiving chamber 24 where the shot may be collected and reused in a conventional manner. It may also be noted that the spray heads 116 may be moved through the drill pipe 66 any desired number of times to provide the desired coverage. It will further be apparent that the size of the shot being used and the velocity of the shot may be controlled as desired to obtain the desired effect. In any event, the entire inner surface of each joint of drill pipe is effectively peened to not only increase the fatigue life of the point but also to remove various types of surface defects, such as corrosion and mill scale.

As the spray heads 116 are withdrawn from the drill pipe 66, the supply of high pressure air and shot through the hoses 92 and 94 is discontinued and the rotation of the drill pipe 66 is stopped. Also, the operating lever 152 of the holding mechanism is turned in a direction to raise the arms 148 and disengage the rollers 150 from the boxes 66a of the drill pipe. Further movement of the carriage 82 toward the end 98b of the frame 98 will completely withdraw the lances 80 from the drill pipe and remove the lances from the immediate vicinity of the inside peening rack 22. Also, as previously noted, the spray heads 116 contact the head 122 and withdraw the head 122 from the drill pipe 66 simultaneously with movement of the carriage 82 toward the end 98b of the frame 98.

The ram 48 of the inside peening rack 22 is then retracted to pivot the legs 42 and simultaneously remove the drill pipe 66 from the shot receiving chamber 24 and lower the drill pipe to a position between the shot receiving chamber 24 and the lance structure 26. The drill pipe 66 is then manually rolled onto the conveyor 28, as previously described in connection with FIG. 1, with the joints of drill pipe being placed sequentially on the conveyor means 28 for sequential lengthwise movement through the outside peening chamber 30.

Figure 9:
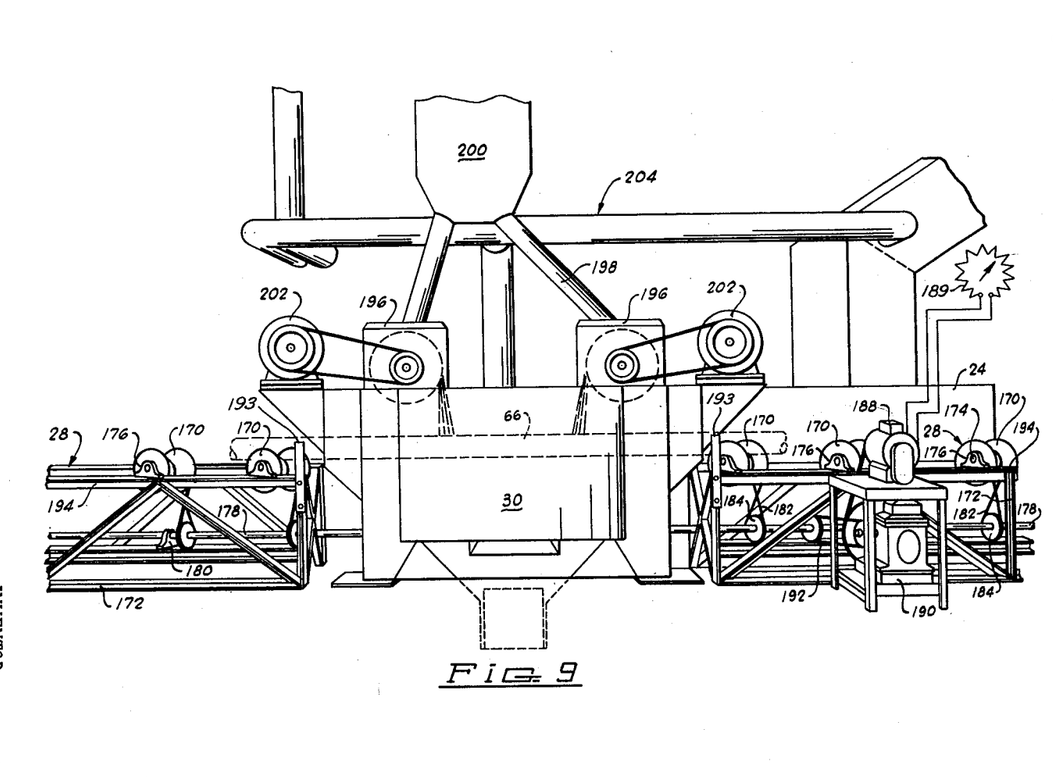
FIGURE 9 is an elevational view of the external peening mechanism and a portion of the conveyor structure used for moving the drill pipe through the outside peening chamber.
Figure 10:
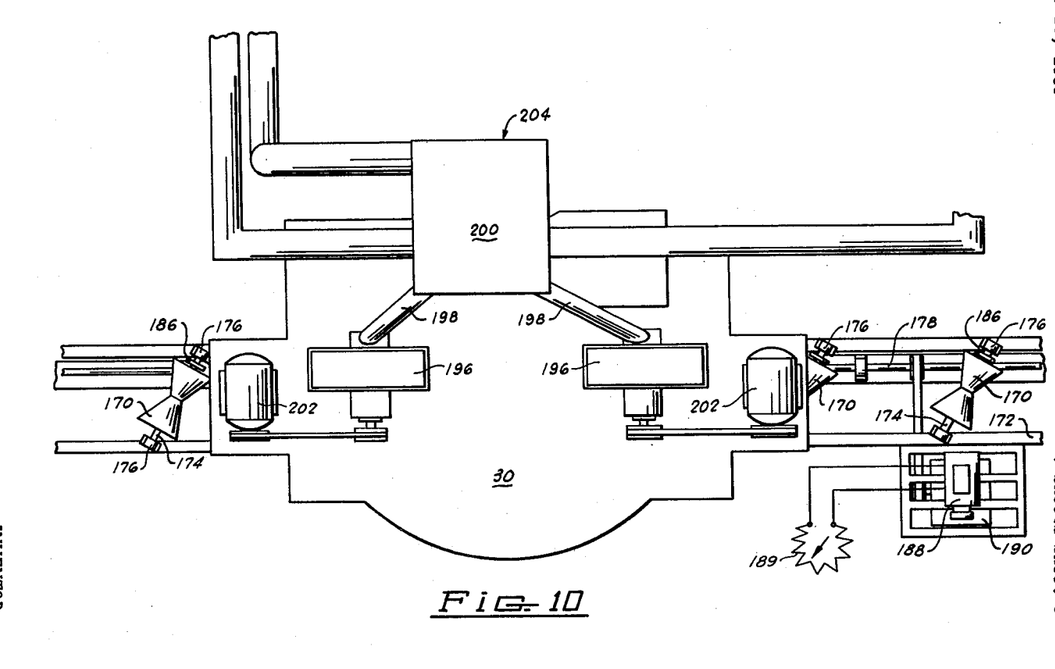
FIGURE 10 is a plan view of the structure shown in FIG. 9.

As shown in FIGS. 9 and 10, the conveyor means 28 comprises aligned rows of rollers 170 supported by a suitable frame work 172 on each side of the outside peening chamber 30. Each roller 170 is divergingly tapered to a smaller diameter from its opposite ends and is supported on a shaft 174 which is in turn journaled by suitable bearings 176 on the top rails of the frame 172. Furthermore, each of the rollers 170 is supported at an angle with respect to the path of movement of the drill pipe 66, such that when a joint of drill pipe is supported on a plurality of the rollers 170, and the rollers are simultaneously turned in the same direction, the drill pipe will not only be moved lengthwise along the row of rollers, but will also be simultaneously turned around its longitudinal axis. All of the rollers 170 of the conveyor means 28 are turned simultaneously by means of a long drive shaft 178 suitably supported by bearings 180 in the frame 172. Rotation of the shaft 178 is transmitted to each of the rollers 170 by means of a suitable belt 182 extending around a pulley 184 on the shaft 178 and a smaller pulley 186 mounted on the shaft 174 of the respective roller 170. It may also be noted that the drive shaft 178 extends through the lower end portion of the outside peening chamber 30, but may be easily protected from shot being discharged in the chamber 30 by any suitable guarding means (not shown). The shaft 178 is driven from a suitable power unit 188, such as a variable speed motor controlled by a rheostat 189, through the medium of speed reduction gearing 190 and a driving belt 192, such that the speed of the rollers 170 may be adjusted as desired. In this connection, it may also be noted that the upper rail 194 of the frame 172 at one end of the rollers 170 may be made adjustable, as, for example, by the use of pivotally mounted actuating levers 193, such that the angle of the rollers 170 may be varied to control the speed of rotation of the drill pipe 66 being conveyed along the conveyor 28.

The width of the outside peening chamber 30 is substantially less than the length of each joint of the drill pipe 66, such that each joint of drill pipe may be moved through the chamber 30 without the necessity of a conveying means within the chamber. It will be understood that openings (not shown) are provided in each side of the chamber 30 through which the drill pipe 66 will be moved by action of the conveyor means 28, and each of these openings may be provided with a cover 158 of the same type illustrated in FIG. 6 for the shot receiving chamber 24 to minimize the loss of shot from the chamber 30 during the peening operation.

In the preferred embodiment of this invention, two centrifugal shot throwing wheels 196 are mounted on the top of the outside peening chamber 30 to throw the shot downwardly in two separate streams toward the drill pipe 66 being moved through the chamber, as illustrated by the dashed lines in FIG. 9. It is also preferred that each of the shot throwing wheels 196 be adjusted such that the two streams of shot will contact the outer surface of the drill pipe 66 at different angles of attack and provide an additional cold working of the outer surface of the drill pipe which is not attainable with a single angle of attack of the shot. In other words, when the shot is directed against the outer surface of the drill pipe at two different angles of attack, the metal in the outer surface layers of the drill pipe will be worked in two different directions to provide increased residual compressional forces in the outer surface layers and further increase the fatigue life of the drill pipe. Each of the shot throwing wheels 196 is provided with shot through a suitable tube 198 from a central hopper 200, and each of the shot throwing wheels is operated by a separate motor 202 in a manner common to the art. It may also be noted that the used shot from the shot receiving chamber 24 and the outside peening chamber 30 is passed through a suitable separating apparatus, generally designated by reference character 204, for cleaning the shot and automatically replacing the fractured shot. The separating apparatus 204 may be of any suitable type, such as that manufactured by the Pangborn Company, and it is not believed necessary to describe it in detail herein.

Figures 11, 12, 13:
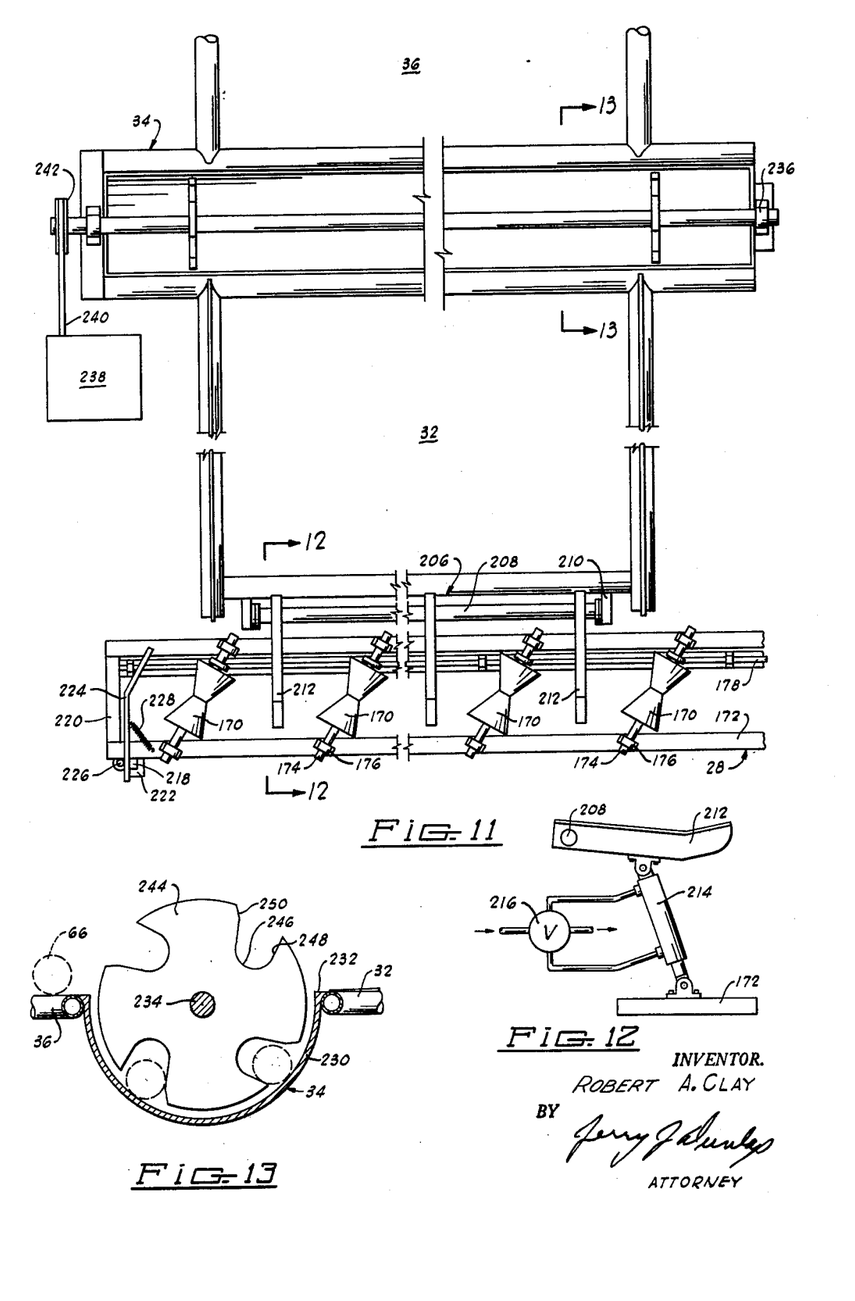
FIGURE 11 is a plan view of the dipping vat and the means used for moving the drill pipe to and through the dipping vat.
FIGURE 12 is a sectional view as taken along lines 12—12 of FIG. 11 illustrating the means for lifting a joint of drill pipe off of the conveyer onto the intermediate storage rack.
FIGURE 13 is a sectional view through the dipping vat as taken substantially along lines 13—13 of FIG. 11 illustrating the construction of one of the discs used for moving a joint of drill pipe through the dipping vat.

As previously indicated in FIG. 1, and shown in detail in FIG. 11, the conveyor means 28 extends from the outside peening chamber 30 along side the intermediate storage rack 32. As each joint of drill pipe moves along side the intermediate storage rack 32 it is lifted from the conveyor 28 onto the rack 32 by a novel lifting mechanism generally designated by reference character 206. The lifting mechanism 206 comprises a shaft 208 supported by suitable bearings 210 on the end of the intermediate storage rack 32 parallel with the conveyor 28 and between the conveyor 28 and the rack 32. A plurality of arms 212, having their outer ends turned upwardly, are rigidly secured on the shaft 208 and normally extend into the conveyor 28 above the frame work 172, but below the level of the rollers 170. As shown in FIG. 12, one of the arms 212 is pivotally connected to the upper end of a double acting ram 214, and the lower end of the ram is pivotally connected to a portion of the frame work 172 of the conveyor 28. The ram 214 is controlled by a suitable valve 216 for alternately raising and lowering the arms 212. It will be apparent that since all of the arms 212 are rigidly connected to the shaft 208, the arms 212 will be simultaneously raised and lowered upon operation of the ram 214.

The control valve 216 is operated by a suitable switch 218 mounted on the end 220 of the conveyor frame work 172 through any suitable system (not shown). The arm 222 of the switch 218 extends upwardly above the frame work 172 into the path of movement of a paddle member 224 which is pivotally secured by a pin 226 in a position to extend over the frame work 172 in the path of movement of a joint of drill pipe being moved along the rollers 170. When a joint of drill pipe is moved by the conveyer 28 into contact with the paddle 224, the switch arm 222 is contacted by the paddle to operate the control valve 216 and extend the ram 214. The lifting arms 212 therefore are raised into contact with the joint of drill pipe at various points along the length of the joint to simultaneously lift and roll the joint of drill pipe onto the intermediate storage rack 32. As soon as the joint of drill pipe has been moved onto the rack 32, the paddle 214 is moved back to its original position by a suitable spring 228 to release the switch arm 222 and throw the valve 216 to its opposite position; whereupon the ram 214 is retracted to again lower the lifting arms 212 below the rollers 170 and below the path of movement of the next joint of drill pipe being conveyed along the conveyer 28. It will thus be apparent that the drill pipe is automatically conveyed onto the intermediate storage rack 32 after leaving the outside chamber 30, without the necessity of using manual labor. The peened drill pipe is then rolled along the intermediate storage rack toward the dipping vat 34, as previously indicated.

The dipping vat 34 comprises an elongated housing 230 which is semi-circular in cross section as shown in FIG. 13, and is suitably supported with the upper edges 232 of the housing approximately level with the height of the intermediate storage rack 32 and the final storage rack 36. It will be apparent that the length of the dipping vat 34 is greater than the length of a joint of drill pipe passing through the system, and the vat is filled with a suitable liquid coating material, such as a bituminous material, which will protect the peened drill pipe from corrosion while the drill pipe is in storage.

A shaft 234 is supported lengthwise with respect to the housing 230 by suitable bearings 236 at the opposite ends of the vat and is supported concentrically with respect to the curved housing 230. A suitable power unit 238 is connected by a belt 240 and pulley 242 to one end of the shaft 234 to rotate the shaft, as will be described.

At least two circular discs 244 are rigidly secured on the shaft 234 in spaced relation along the length of the shaft and within the vat 34. The outer edge of each disc 244 extends into proximity with the inner surface of the housing 230, such that the spacing between the periphery of each disc and the inner surface of the housing 230 is substantially less than the diameter of a joint of drill pipe, but is sufficient to permit free rotation of the discs 244. Also, each disc 244 is provided with a plurality of circumferentially spaced slots 246 in the outer periphery thereof to receive joints of drill pipe from the intermediate storage rack 32 and convey these joints of drill pipe through the dipping vat 34 onto the final storage rack 36.

As shown in FIG. 13, each slot 246 has one edge 248 thereof substantially flat to receive drill pipe from the intermediate storage rack 32. The opposite edge 250 of each slot is curved to automatically roll a joint of drill pipe out of the respective slot when the slot is raised to a level of the final storage rack 36. It will also be noted that as each joint of drill pipe is moved through the vat 34 by a clockwise rotation of the shaft 234 (when viewed as in FIG. 13) the drill pipe is rolled along the inner surface of the housing 230, but is completely submerged in the coating material in the vat to effectively coat both the inner and outer surfaces of the pipe. The slots 246 in the disc 244 are aligned, such that each joint of drill pipe will be engaged by all of the discs 244 and during operation of the system the power unit 238 may be operated continuously, since a joint of drill pipe rolled into contact with the disc 244 will be automatically engaged by a group of the aligned slots 246 and conveyed through the vat 34, without the necessity of manually starting and stopping the power unit 238.

From the foregoing it will be apparent that the present invention provides a complete system for efficiently and economically peening the inside and outside surfaces of drill pipe, as well as applying a preservative coating on all the surfaces of the drill pipe. The system includes a novel construction for moving drill pipe into position for internal peening and for external peening and for rotating the drill pipe during the internal peening operation, with a minimum of equipment and manual effort. Spray heads are moved through the rotating drill pipe in a novel manner by means of a novel construction for efficiently providing the desired coverage of the inner surface of the pipe. It will also be apparent that the present invention provides a novel spray head construction for discharging shot against the inner surfaces of a rotating joint of drill pipe. The drill pipe is also manipulated through an outside peening chamber by a novel conveyer structure for efficient coverage of the outside surface of the pipe, and then the pipe is raised to an intermediate storage rack by a novel lifting mechanism, automatically, without the requirement of manual effort. The peened drill pipe is automatically moved through a dipping vat to provide a preservative coating on both the inner and outer surfaces of the pipe for preventing corrosion of the pipe during storage. Finally, it will be apparent that the present invention provides a novel arrangement of shot throwing wheels for efficiently peening the outer surfaces of drill pipe. The coverage obtained in both the internal and external peening operations may be periodically checked by attaching an Almen test strip to the pipe in an exposed position, and then gauging the curvature of the strip in a conventional manner. Therefore, the number of passes of the spray heads through the pipe and the speed of movement of the pipe through the outside peening chamber may be adjusted to provide the desired coverage.

Changes may be made in the combination and parts or elements as well as steps and procedures, as heretofore set forth in the specification and shown in the drawings, it being understood that changes may be made in the precise embodiment disclosed without departing from the spirit and scope of the invention as defined in the following claims:

I claim:

1. In a system for increasing the fatigue life of a joint or drill pipe, the combination comprising: a shot receiving chamber having an opening in one wall thereof, a base positioned adjacent said receiving chamber, an elongated platform for receiving and supporting the joint thereon, legs at each end of the platform pivotally secured to the platform and to the base for pivotal movement of the legs about a horizontal axis and in a vertical plane toward and away from said receiving chamber, means for pivoting said legs on said base for simultaneously raising the joint and moving the joint toward said receiving chamber, and, alternately moving the joint away from the receiving chamber and lowering the joint, means for rotating the joint about its longitudinal axis while said one end portion extends into said opening, means for shot peening the inner surfaces of the rotating joint and discharging the used shot through the joint into said shot receiving chamber, an outside peening chamber positioned adjacent said inner surface shot peening means for peening the outer surface of said drill pipe joint immediately following the peening of the inner surface thereof, conveyor means for moving the joint lengthwise through the outside peening chamber while simultaneously rotating the joint about its longitudinal axis, means for manually controlling the axial and rotative movement of said joint by said conveyor means to permit the duration of exposure of the surfaces of said joint in said outside peening chamber to be controlled, and means in the outside peening chamber for throwing shot onto the outer surfaces of the joint as it is moved through the outside peening chamber.

2. A system as defined in claim 1 wherein two of said legs are provided at each end of the platform and all of said legs are of equal length to maintain the platform horizontal during pivoting movement of said legs.

3. A system as defined in claim 1 wherein said means for rotating the joint while said one end portion extends into said opening comprises a pair of parallel shafts rotatably supported on said platform, rollers on said shafts for supporting the joint above and between said shafts, and means for turning at least one of said shafts.

4. In a system for increasing the fatigue life of drill pipe, the combination of: a shot receiving chamber having a plurality of openings in one wall thereof, an inside peening rack for inserting and withdrawing a joint of drill pipe through each of said openings and rotating the drill pipe while the joints are inserted through said openings, and means for spraying shot against the inner surfaces of the drill pipe while the pipe is rotated, said inside peening rack comprising an elongated platform having a length less than the joints of drill pipe, a base adjacent said wall of the shot receiving chamber, legs pivotally secured to the platform and the base for pivoting movement over the base toward and away from said openings, means for supporting the drill pipe centrally on the platform parallel with said openings and for rotating the drill pipe, and means for pivoting said legs to alternately insert the drill pipe in and withdraw the drill pipe from said openings while simultaneously raising and lowering the platform.

5. A system as defined in claim 4 wherein said means for supporting the drill pipe on the platform and rotating the drill pipe comprises a plurality of shafts rotatably supported on the platform in side-by-side spaced relation parallel with said openings, rollers secured along each of said shafts for supporting a joint of the drill pipe above and between each pair of said shafts and frictionally engaging the drill pipe, and means for rotating said shafts in the same direction.

6. A system as defined in claim 4 wherein a pair of said legs are secured between each end of the platform and the base, and wherein all of said legs are of the same length to retain the platform horizontal in all positions of said legs.

7. In a system for increasing the fatigue life of a joint of drill pipe, the combination comprising: a shot receiving chamber having an opening in one wall thereof, means for inserting and withdrawing one end portion of the joint in and out of said opening, means for rotating the joint about its longitudinal axis while said one end portion extends into said opening, means for shot peening the inner surfaces of the rotating joint and discharging the used shot through the joint into said shot receiving chamber, an outside peening chamber positioned adjacent said inner surface shot peening means for peening the outer surface of said drill pipe joint immediately following the peening of the inner surface thereof, conveyor means for moving the joint lengthwise through the outside peening chamber while simultaneously rotating the joint about its longitudinal axis, said conveyor means including a plurality of rollers supported in spaced relation, means for manually controlling the axial and rotative movement of said joint by said conveyor means to permit the duration of exposure of the surfaces of said joint in said outside peening chamber to be controlled, means in the outside peening chamber for throwing shot onto the outer surfaces of the joint as it is moved through the outside peening chamber, an intermediate storage rack positioned adjacent said conveyor means and along which the joint may be manually rolled, a shaft rotatably supported between said conveyor means and the intermediate storage rack parallel with said conveyor means, a plurality of lifting arms rigidly secured on said shaft and being of a length to extend between adjacent rollers of said conveyor means and under a joint of drill pipe supported on said rollers, a control paddle pivotally supported on said conveyor means at a point spaced from the outside peening chamber a distance greater than the length of the joint and arranged in the path of movement of the joint being conveyed from the outside peening chamber, and power means connected to said control arm and said shaft for pivoting said lifting arms upwardly and toward the intermediate storage rack when the joint strikes the paddle to lift the joint from said conveyor means onto the intermediate storage rack.

8. In a system for increasing the fatigue life of drill pipe, the combination of: means for supporting a plurality of joints of drill pipe in parallel relation and for rotating the joints of drill pipe, and means for spraying shot at a high velocity against the inner surfaces of the rotating drill pipe, said last mentioned means comprising a frame structure, a set of tracks supported on the frame structure in alignment with the drill pipe but below the drill pipe, a carriage movably supported on said tracks, an elongated tubular lance for each of the joints of drill pipe attached at one end thereof to the carriage and extending from the carriage over the frame structure toward the respective joint of drill pipe, rollers on the frame structure supporting the intermediate portions of the lances to maintain the lances in alignment with the respective joints of drill pipe, a shaft extending transversely under said lances between said carriage and said rollers, wheels on said shaft engaging said tracks, and a second set of rollers rigidly secured on said shaft in position to engage said lances and further support the intermediate portions of said lances, a spray head on each lance at the end opposite its attached end of a size to enter the respective joint of drill pipe, means for moving the carriage in opposite directions along the tracks for telescoping the lances through the joints of drill pipe, and means for feeding shot and high pressure air into said one end of each lance to peen the inner surfaces of the drill pipe.

9. In a system for increasing the fatigue life of drill pipe, the combination of: means for supporting a plurality of joints of drill pipe, and means for spraying shot at a high velocity against the inner surfaces of the rotating drill pipe, said last-mentioned means comprising a frame structure, a set of tracks supported on the frame structure in alignment with the drill pipe but below the drill pipe, a carriage movably supported on said tracks, an elongated tubular lance for each of the joints of drill pipe attached at one end thereof to the carriage and extending from the carriage over the frame structure toward the respective joint of drill pipe, rollers on the frame structure supporting the intermediate portions of the lances to maintain the lances in alignment with the respective joints of drill pipe, a spray head on the opposite end of each lance having a diameter smaller than the respective joint of drill pipe and larger than respective lance upon which it is mounted, a head member between said frame structure and the drill pipe joints and having apertures therein slidingly receiving the lances therethrough, each of said apertures being smaller than the diameter of the respective spray head for movement of the head member upon movement of the lances away from the drill pipe, bracing means movably supporting the head member on the frame structure, a weight connected to said bracing means constantly urging the head member toward the drill pipe, holding means carried by the head member for engaging the rotating drill pipe and preventing independent lengthwise movement of the rotating drill pipe during the peening of the drill pipe, means for moving the carriage in opposite directions along the tracks for telescoping the lances through the joints of drill pipe, and means for feeding shot and high pressure air into said one end of each lance to peen the inner surfaces of the drill pipe.

10. A system as defined in claim 9 wherein said holding means comprises a shaft journaled to the head member and extending transversely above the lances, a bifurcated arm rigidly secured to said shaft above each lance of a size to straddle an intermediate portion of the drill pipe in one position thereof, rollers carried by each bifurcated arm for engaging the outer periphery of the respective joint of drill pipe inward of the respective end of the drill pipe when the respective arm is turned downwardly toward the drill pipe, and an operating lever on one end of said shaft for raising and lowering said arms.

11. In a system for increasing the fatigue life of drill pipe, the combination of: a shot-receiving chamber having a plurality of openings in one wall thereof, an inside peening rack for inserting and withdrawing one end of a joint of drill pipe through each of said openings, means projecting into the other ends of each of said joints for spraying shot against the inner surfaces of the drill pipe, and means for sealing said other ends of said joint around said shot-spraying means whereby said shot are carried through said joints and into said shot-receiving chamber by air pressure and the momentum of said shot, said inside peening rack comprising an elongated platform having a length less than the length of the joints of the drill pipe, a base adjacent said wall of the shot-receiving chamber, legs pivotally secured to the platform and the base for pivoting movement over the base toward and away from said openings, and means for pivoting said legs to alternately insert the drill pipe in, and withdraw the drill pipe from, said openings while simultaneously raising and lowering the platform.

References Cited in the file of this patent

UNITED STATES PATENTS

| | | |
|---|---|---|
| 445,197 | Phillips | Jan. 27, 1891 |
| 602,417 | McCool | Apr. 12, 1898 |
| 611,900 | Garland | Oct. 4, 1898 |
| 714,344 | Westmark | Nov. 25, 1902 |
| 930,522 | Weiss | Aug. 10, 1909 |
| 949,622 | Crakin | Feb. 15, 1910 |
| 1,120,731 | McIlroy | Dec. 15, 1914 |

(Other references on following page)

UNITED STATES PATENTS

| | | |
|---|---|---|
| 1,521,010 | Cunningham | Dec. 30, 1924 |
| 1,528,885 | Mather | Mar. 10, 1925 |
| 1,687,102 | Meurer | Oct. 9, 1928 |
| 1,897,951 | Camerota | Feb. 14, 1933 |
| 1,952,848 | Eckler | Mar. 27, 1934 |
| 2,038,204 | Bidle | Apr. 21, 1936 |
| 2,114,974 | Camerota | Apr. 19, 1938 |
| 2,131,769 | Turnbull | Oct. 4, 1938 |
| 2,439,032 | Almen | Apr. 6, 1948 |
| 2,451,635 | Sehratt | Oct. 19, 1948 |
| 2,621,446 | Russell | Dec. 16, 1952 |
| 2,692,458 | Lawrence | Oct. 26, 1954 |
| 2,901,867 | Bolton | Sept. 1, 1959 |

FOREIGN PATENTS

| | | |
|---|---|---|
| 13,808 | Australia | Dec. 18, 1928 |